(12) United States Patent  (10) Patent No.: US 7,810,821 B2
Trine et al.                  (45) Date of Patent:      Oct. 12, 2010

(54) STORAGE DEVICE FOR USE WITH A PALLET JACK

(75) Inventors: Barry Trine, Fremont, IN (US); Robert A Link, Angola, IN (US); Deryl T Webster, Angola, IN (US); Matthew Clements, Angola, IN (US); Ralph Trine, Fremont, IN (US)

(73) Assignee: Vestil Manufacturing Corp., Angola, IN (US)

( * ) Notice: Subject to any disclaimer, the term of this patent is extended or adjusted under 35 U.S.C. 154(b) by 1216 days.

(21) Appl. No.: 11/168,123

(22) Filed: Jun. 28, 2005

(65) Prior Publication Data

US 2006/0291986 A1    Dec. 28, 2006

(51) Int. Cl.
 *B62B 1/00*  (2006.01)
(52) U.S. Cl. .................. 280/43.12; 280/769; 224/401; 187/231
(58) Field of Classification Search ............ 280/33.992, 280/651, 43, 43.12, 47.34, 769; 224/401; 187/222, 237, 231; 180/19.1, 19.2, 19.3; 414/495, 490; 296/24.34, 37.1
See application file for complete search history.

(56) References Cited

U.S. PATENT DOCUMENTS

| | | | |
|---|---|---|---|
| 3,249,170 A | | 5/1966 | Quayle |
| 3,371,815 A | * | 3/1968 | Macomber .................. 220/1.5 |
| 3,601,423 A | | 8/1971 | Goodacre |
| 3,963,257 A | * | 6/1976 | Harron .................... 280/43.12 |
| 4,065,012 A | * | 12/1977 | Rocco ........................ 414/471 |
| 4,221,526 A | | 9/1980 | Crandall |
| 4,591,065 A | * | 5/1986 | Foy ............................... 220/7 |
| 4,666,004 A | | 5/1987 | Raz |
| 4,796,791 A | * | 1/1989 | Goss et al. .................. 224/275 |
| 5,085,481 A | * | 2/1992 | Fluharty et al. ............ 296/37.8 |
| 5,338,081 A | * | 8/1994 | Young et al. ............. 296/37.14 |
| 5,417,536 A | | 5/1995 | Cech |
| 5,881,982 A | * | 3/1999 | Hollingsworth et al. ..................... 248/220.31 |
| 6,125,971 A | * | 10/2000 | Niebuhr et al. .............. 187/231 |
| 6,152,514 A | * | 11/2000 | McLellen .................. 296/37.8 |
| 6,435,587 B1 | * | 8/2002 | Flowerday et al. ......... 296/37.8 |
| 6,595,306 B2 | * | 7/2003 | Trego et al. ................ 180/19.2 |
| D492,833 S | | 7/2004 | Henshaw et al. |
| 6,766,882 B2 | * | 7/2004 | Lohmann .................... 187/231 |
| 6,883,625 B2 | | 4/2005 | Trego et al. |
| 7,165,776 B2 | * | 1/2007 | Quinlan et al. ........... 280/43.12 |
| 2003/0197351 A1 | | 10/2003 | Burger et al. |

* cited by examiner

*Primary Examiner*—Paul N Dickson
*Assistant Examiner*—John R Olszewski
(74) *Attorney, Agent, or Firm*—Baker & Daniels LLP

(57) ABSTRACT

A pallet jack assembly includes a pallet jack having a frame assembly. An attachment includes a shell having a bottom wall and at least one side wall. The bottom wall and the at least one side wall define a storage cavity. The bottom wall is supported by the frame assembly.

18 Claims, 4 Drawing Sheets

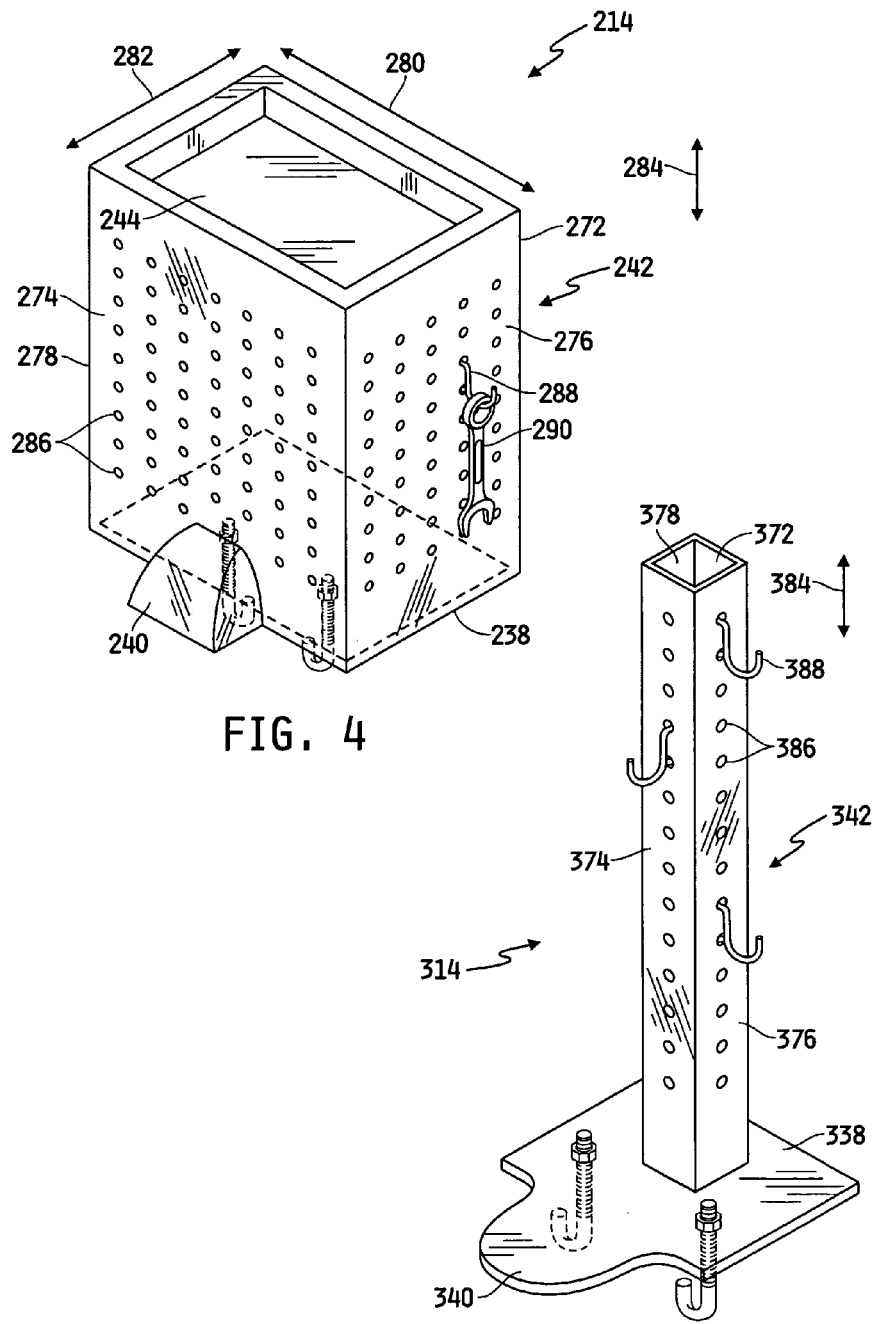

STORAGE DEVICE FOR USE WITH A PALLET JACK

TECHNICAL BACKGROUND

This invention relates generally to pallet jacks, and, more particularly, to a storage device for use with a pallet jack.

BACKGROUND OF THE INVENTION

A pallet is a portable platform used for supporting a load of cargo or freight. Pallet jacks, also known as "pallet trucks," are wheeled vehicles used to latch onto pallets, raise the pallets above ground level, and transport the pallets and any items stored thereon. A pallet jack may be powered by a motor or engine, or may be manually driven.

Conventional pallet jacks provide no convenient way to transport tools, writing utensils, clipboards, and other miscellaneous items along with the pallet and its cargo. If the pallet jack operator would like to transport such miscellaneous items, he may place them on the pallet or cargo where they are subject to, among other things, falling off during transport. Alternatively, the operator may carry whatever items he is able to in one hand while he tries to operate the pallet jack with the other hand. This is a difficult task for the operator and presents safety concerns. Another option is for the operator to place the items in some type of container, such as a bag with a handle, that he must carry on his person. Carrying a bag is not particularly convenient for the operator and may present other safety concerns if some part of the bag becomes caught in machinery while the handle of the bag is draped over the operator's limb or torso.

What is needed in the art is an apparatus that enables an operator of a pallet jack to conveniently and safely transport miscellaneous items along with the pallet jack itself.

SUMMARY OF THE INVENTION

The present invention provides a pallet jack assembly including a container attachment that is securely fastened to the frame assembly of the pallet jack. The attachment may include a top storage tray that is disposed some distance directly above the top surface of the frame assembly such that the tray and its contents are within convenient arms length of the operator. The body of the attachment may be in the form of a shell having an interior storage cavity that may be suitable for storing bulky items which do not fit in the tray. On a side of the body facing the operator there may be provided an opening into the cavity. The lateral sides of the body may also include openings into the cavity.

According to one embodiment of the invention, a pallet jack assembly includes a pallet jack having a frame assembly. An attachment includes a shell having a bottom wall and at least one side wall. The bottom wall and the at least one side wall define a storage cavity. The bottom wall is supported by the frame assembly.

According to another embodiment of the present invention, a storage device for use with a pallet jack includes a base supported by the frame assembly of the pallet jack. The base has a first width. A tray includes at least one upstanding wall. The tray has a second width that is greater than the first width. A tapered body interconnects the base and the tray. An attachment mechanism attaches the storage device to the frame assembly of the pallet jack.

According to yet another embodiment of the present invention, a pallet jack assembly includes a pallet jack having a frame assembly. An attachment includes a bottom surface in engagement with the frame assembly. A storage device is operably disposed directly above the frame assembly and the bottom surface.

BRIEF DESCRIPTION OF THE DRAWINGS

The present invention will now be described, by way of example, with reference to the accompanying drawings, in which:

FIG. 4 is a rear, perspective view of another embodiment of a storage attachment that may be included in a pallet jack assembly of the present invention.

FIG. 5 is a rear, perspective view of yet another embodiment of a storage attachment that may be included in a pallet jack assembly of the present invention.

Figure 1:
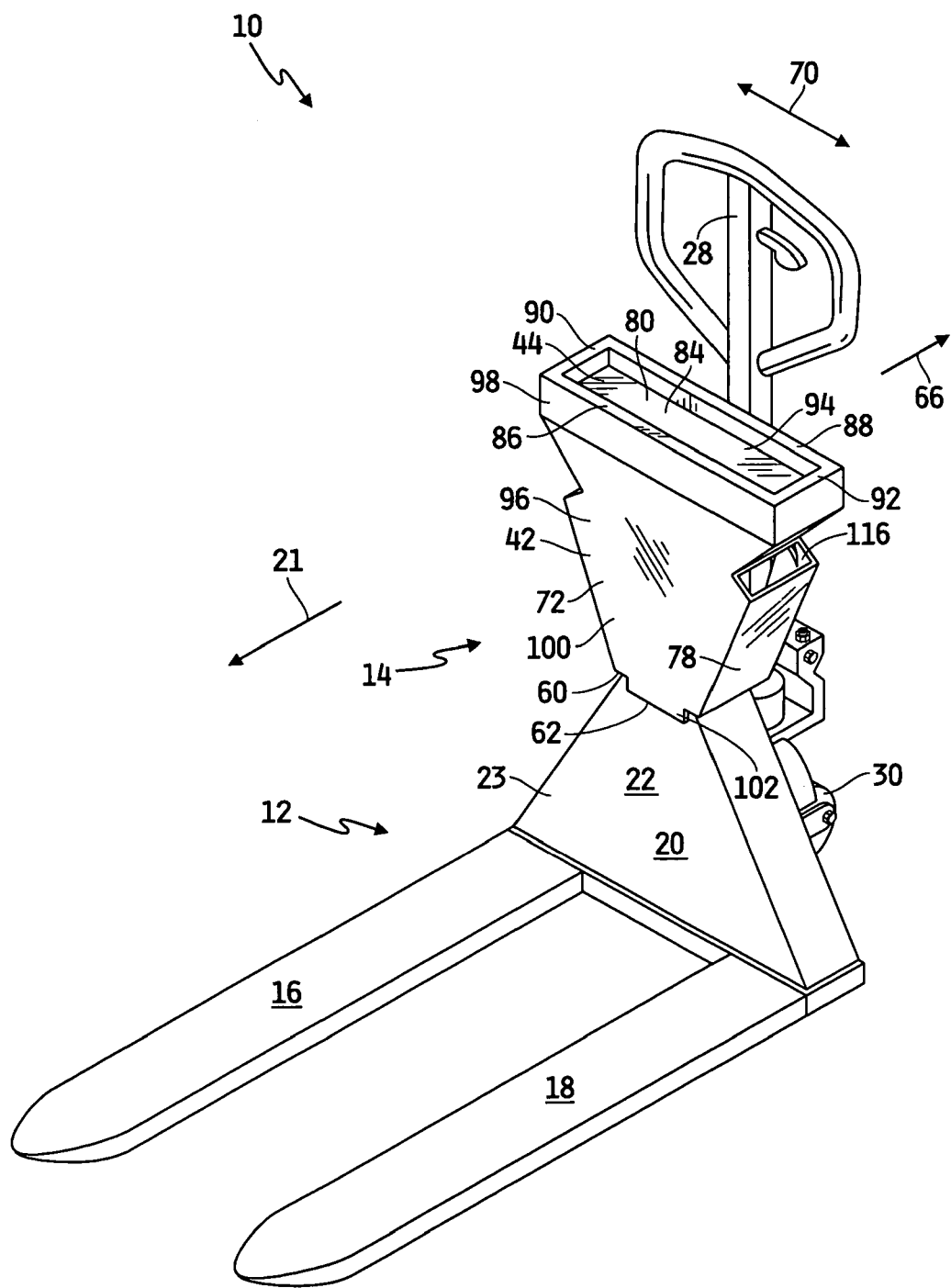
FIG. 1 is a front, perspective view of one embodiment of a pallet jack assembly of the present invention.

Corresponding reference characters indicate corresponding parts throughout the several views. Although the drawings represent an embodiment of the present invention, the drawings are not necessarily to scale and certain features may be exaggerated in order to better illustrate and explain the present invention. The exemplifications set out herein illustrate an embodiment of the invention and such exemplifications are not to be construed as limiting the scope of the invention in any manner.

DESCRIPTION OF INVENTION

Referring now to the drawings, and particularly to FIG. 1, there is shown one embodiment of a pallet jack assembly 10 of the present invention, including a pallet jack 12 and an attachment 14. Pallet jack 12 includes a pallet-engaging device in the form of tines 16, 18, and a frame assembly 20 interconnecting tines 16, 18. Tines 16, 18 extend in a forward direction 21 from frame assembly 20.

Frame assembly 20 includes a triangular housing 22 that may be attached to or integral with each of tines 16, 18. Housing 22 includes a front surface 23 that may be vertically oriented.

A housing cap 24 (FIG. 2) may be provided at a peak of the triangular housing 22. Housing cap 24 may be coupled to a pivot shaft 26 that enables a handle 28 and a pair of rollers 30 to be pivoted about a vertical axis 32 of pivot shaft 26 relative to tines 16, 18 and housing 22. Housing cap 24 includes a top wall 33 having a flat upper surface 34 that may be horizontally oriented. That is, surface 34 may be parallel to tines 16, 18 and to a floor surface 36 (FIG. 3) on which rollers 30 rest. Surface 34 may support attachment 14, as described in more detail below.

Housing cap 24 may also include one or more side walls 35 extending downward from the outer edge of top wall 33. Top wall 33 and side wall(s) 35 may define an interior recess 37.

Attachment 14 may include, or be in the form of, one or more storage devices. The storage device(s) may be used by an operator of pallet jack 12 to store tools or other implements that the operator would like to keep handy or accessible while operating pallet jack 12. Attachment 14 may be attached to pallet jack 12 such that attachment 14 rests upon upper surface 34 of housing cap 24 and is thus within convenient arms length of the operator. The operator would typically stand or walk behind handle 28.

Figure 2:
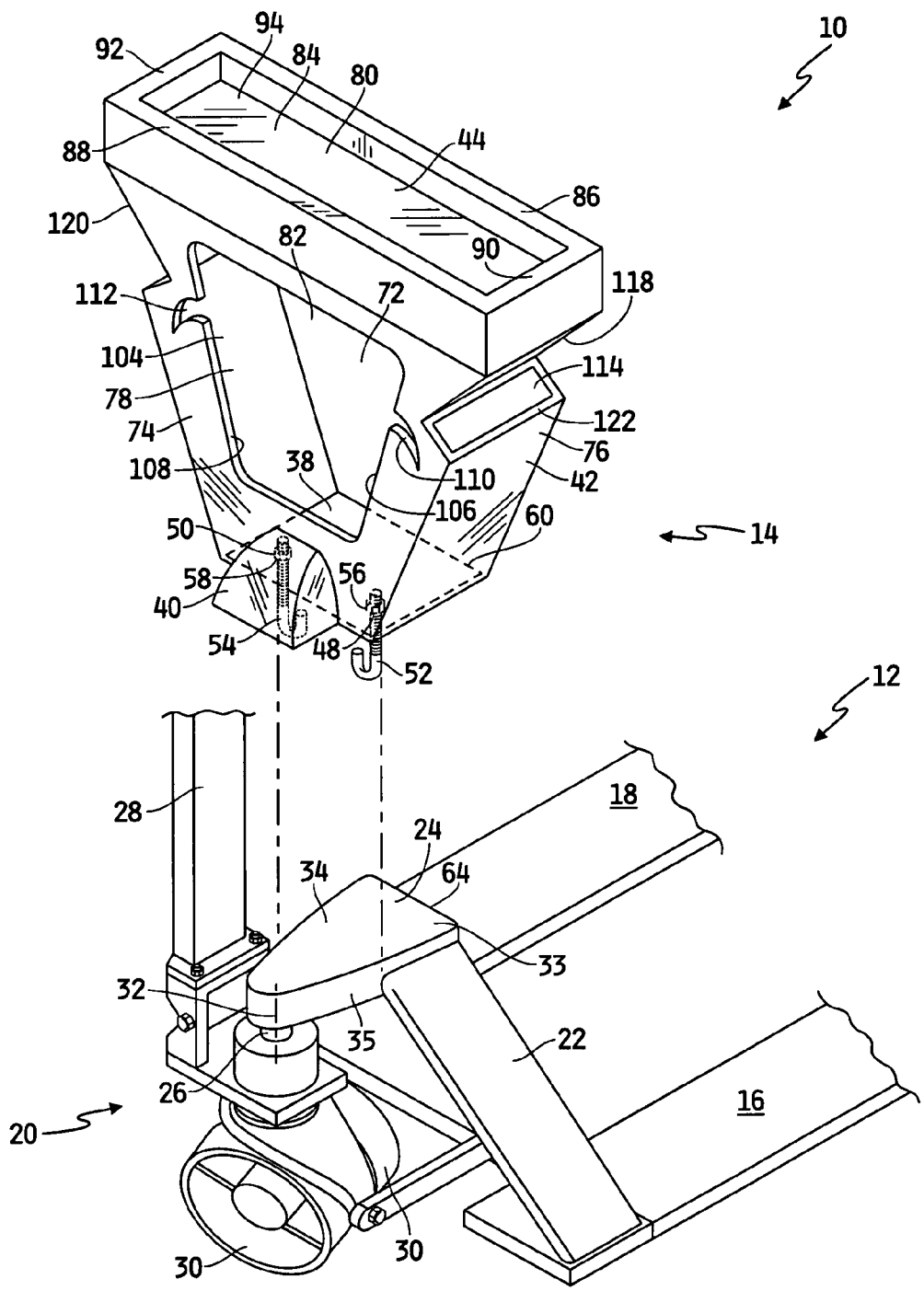
FIG. 2 is a partially exploded, fragmentary, rear, perspective view of the pallet jack assembly of FIG. 1.
Figure 3:
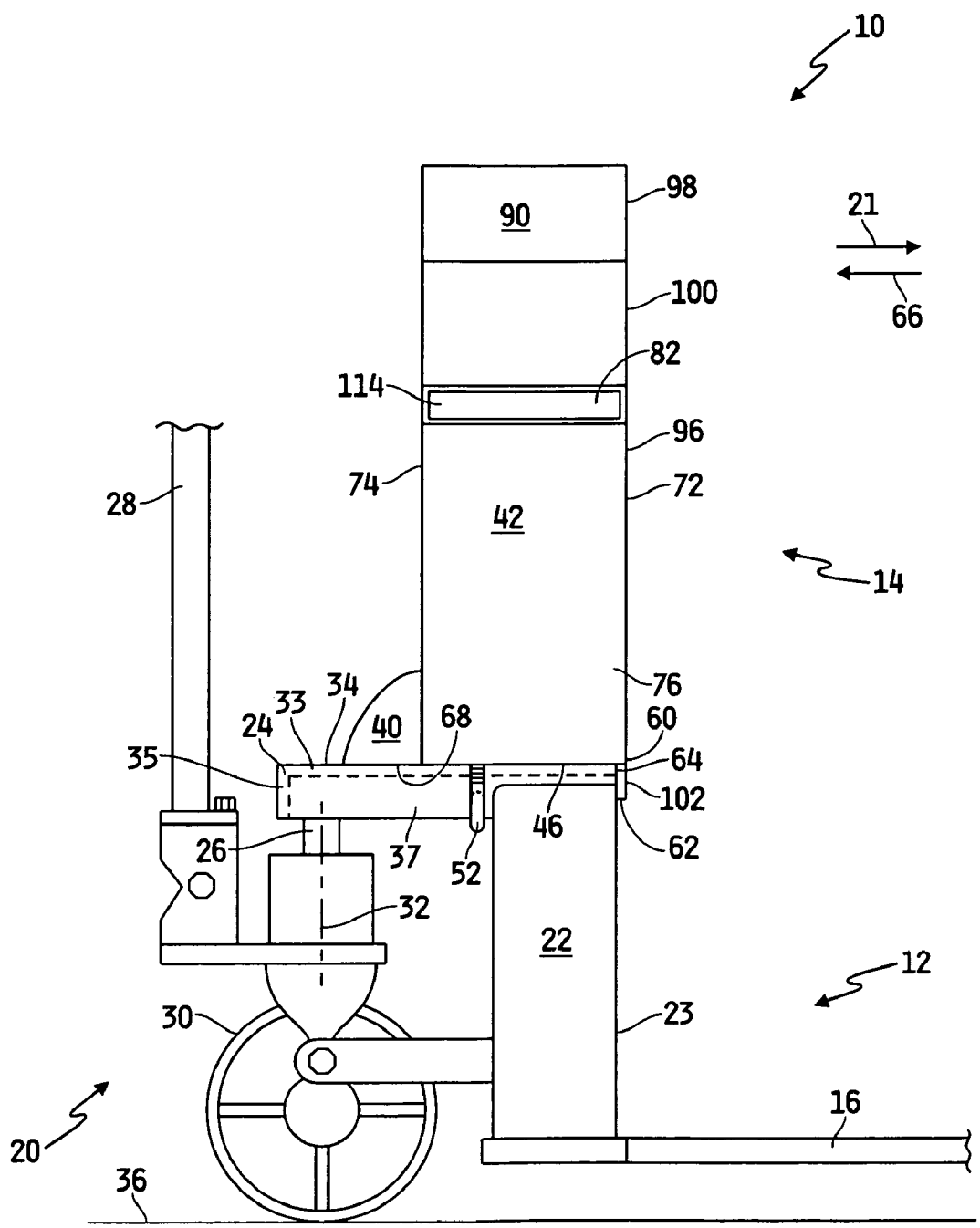
FIG. 3 is a fragmentary, side view of the pallet jack assembly of FIG. 1.

In the embodiment shown in FIGS. 1-3, attachment 14 generally includes a base 38 (FIG. 2), a stabilizing device 40, a body 42 and a storage tray 44. Base 38 may be in the form of a bottom wall having a flat bottom surface 46 that rests upon the flat upper surface 34 of housing cap 24. Base 38 may include throughholes 48, 50 through which the threaded shafts of hooks 52, 54 may extend. Nuts 56, 58 may be each attached to a respective one of the threaded shafts above base 38 to thereby fasten hooks 52, 54 to base 38. Nuts 56, 58 may each have a width greater than the width of a respective throughhole 48, 50. Washers (not shown) may be provided between nuts 56, 58 and base 38.

At a front edge 60 of base 38, a downwardly extending ridge 62 may be provided. Ridge 62 may latch onto a front edge 64 of top wall 33 to thereby limit or prevent any sliding of attachment 14 in a rearward direction 66 relative to pallet jack 12. Rearward direction 66 is opposite forward direction 21.

During assembly, attachment 14 may be slid in rearward direction 66 until ridge 62 engages front edge 64. Hooks 52, 54 may be used as an attachment mechanism for attaching attachment 14 to frame assembly 20 of pallet jack 12. The curved ends of hooks 52, 54 may then be latched over a distal, bottom end of side wall(s) 35 such that the tips of the curved ends of hooks 52, 54 are received in recess 37. Nuts 56, 58 may then be tightened on the threaded shafts of hooks 52, 54 to thereby securely fasten attachment 14 to housing cap 24.

Attachment 14 may also be easily disassembled or removed from pallet jack 12. More particularly, nuts 56, 58 may be loosened on the threaded shafts of hooks 52, 54 until there is enough play to enable the curved ends of hooks 52, 54 to be removed from recess 37.

Stabilizing device 40 is shown in the form of a foot-like device having a bottom surface 68 that may be substantially coplanar with bottom surface 46 of base 38 such that bottom surfaces 46, 68 conjointly form a continuous, flat bottom surface of attachment 14. This continuous, flat bottom surface formed by surfaces 46, 68 rests upon the flat upper surface 34 of housing cap 24. It is possible for the continuous surface formed by surfaces 46, 68 to completely cover and thereby make maximum use of upper surface 34 in a supporting capacity. That is, the continuous surface formed by surfaces 46, 68 may be approximately the same size as upper surface 34.

In another embodiment (not shown), the bottom surface of the attachment is provided with some concavity or arch along directions 21, 66 and possibly along transverse directions 70. Such concavity may provide the attachment with stable footing on upper surface 24 and may reduce any possible rocking of the attachment on upper surface 24.

Body 42 may have four side walls, including a front wall 72, a rear wall 74, and two opposite lateral walls 76, 78, and a top wall 80. Walls 72, 74, 76, 78, 80 in conjunction with a bottom wall in the form of base 38 may form a hollow shell defining an interior storage cavity 82 that is operably disposed directly above both housing cap 24 and base 38. The term "operably disposed" as used herein indicates that the storage device is operable to function in a storage capacity in the position in which the device is disposed. The term "directly above" is used herein to indicate that an object is offset or displaced in a vertical direction from the other object, but is not substantially offset or displaced in a horizontal direction from the other object. Thus, storage cavity 82 may be offset or displaced from housing cap 24 and base 38 in a vertical direction, i.e., in a direction perpendicular to floor surface 36, and might not be substantially offset or displaced from housing cap 24 and base 38 in a horizontal direction, i.e., in a direction parallel to floor surface 36. For example, it may be possible for an imaginary vertical line to pass through each of storage cavity 82, housing cap 24 and base 38. Further, cavity 82 may be operable in a storage capacity when disposed in such a position.

Cavity 82 provides a covered storage device in that top wall 80 covers cavity 82. Thus, cavity 82 may be sheltered from air currents and/or precipitation when pallet jack assembly 10 is disposed outdoors.

Extending upwardly from an upper surface 84 of top wall 80 are four upstanding walls 86, 88, 90, 92. Upper surface 84 and upstanding walls 86, 88, 90, 92 may conjointly define a horizontally-oriented storage tray 94 that is operably disposed directly above both housing cap 24 and base 38. Tray 94 may have a width in transverse directions 70 that is greater than the width of base 38 in transverse directions 70. Thus, the storage area on tray 94 may be relatively large while the space occupied by the lower section of attachment 14, and by base 38 in particular, remains relatively small.

Body 42 may be generally tapered to provide a smooth transition between base 38 and the relatively larger tray 94. More particularly, each of front wall 72 and rear wall 74 may have a width in transverse directions 70 that generally increases from base 38 to tray 94.

In one embodiment, tray 94 has a width in transverse directions 70 of approximately sixteen inches, and base 38 has a width in transverse directions 70 of approximately seven inches. Tray 94 may be disposed approximately eighteen inches above base 38.

Tray 94 may have a depth in directions 21, 66 that is approximately equal to the depth of base 38 in directions 21, 66. Further, body 42 may have a constant depth in directions 21, 66 that is approximately equal to the depths of tray 94 and base 38. In one embodiment, body 42, tray 94 and base 38 each have a depth in directions 21, 66 of approximately six inches.

As best shown in FIG. 3, a front surface 96 of attachment 14, conjointly formed by a front edge or surface 98 of tray 94, a front surface 100 of front wall 72, front edge 60 of base 38 and a front surface 102 of ridge 62, may be planar and vertically oriented. That is, front surfaces 98, 100, 102 and front edge 60 may be vertically coplanar such that each of front surfaces 98, 100, 102 and front edge 60 is directly above or directly below each of the other ones of front surfaces 98, 100, 102 and front edge 60. Front surface 96 may face in forward direction 21. In one embodiment, front surface 96 extends a maximum of six inches past front surface 23 of housing 22 in forward direction 21. In the embodiment shown in FIGS. 1-3, front surface 96 extends less than one inch past front surface 23 in forward direction 21.

Due to front surface 96 of attachment 14 being planar and vertically oriented, any possible interference by attachment 14 with the space above tines 16, 18 is advantageously reduced to a low level. Thus, attachment 14 is not likely to interfere with objects (not shown) carried on a pallet (not shown) that is engaged by tines 16, 18.

Similarly, as best shown in FIG. 3, the surface of rear wall 74 may be planar and vertically oriented. Thus, any possible interference by attachment 14 with the space around handle 28 is also advantageously reduced to a low level. Thus, attachment 14 is not likely to interfere with the movements of handle 28 and its operator.

Rear wall 74 of body 42 may include a generally trapezoidally-shaped opening 104 into cavity 82. Opening 104 is in communication with cavity 82 and faces in rearward direction 66. The generally trapezoidal shape of opening 104 may correspond to the generally trapezoidal shape of attachment 14. Opposite side edges 106, 108 of opening 104 may include respective semi-crescent-shaped notches 110, 112 which may also be used as storage devices.

Lateral walls 76, 78 may each include a respective opening 114, 116 into cavity 82. Each of openings 114, 116 is in communication with cavity 82 and may face in a respective upward or lateral direction perpendicular to forward direction 21 and rearward direction 66. In the embodiment shown, each of openings 114, 116 faces in a respective direction that is about 30° from vertical and about 60° from horizontal. In order to accommodate openings 114, 116, each of lateral walls 76, 78 may include a respective V-shaped notch 118, 120 extending into each of front wall 72 and rear wall 74. Openings 114, 116 are each disposed in a lower leg of a respective one of notches 118, 120.

During use, an operator of pallet jack assembly 10 may store tools, implements, utensils, clipboards and any other desired objects in cavity 82, tray 94 and/or notches 110, 112. Items may be placed in cavity 82 through any of openings 104, 114 and 116. Longer items may be inserted into cavity 82 through one of openings 114, 116 until an end of the item rests upon base 38. The opposite end of the item may be allowed to protrude through opening 114, 116. As one example, a hammer (not shown) may be inserted into opening 114 such that a claw, i.e., cleft end, of the hammerhead hangs on an outer edge 122 of opening 114. Bulkier items may be inserted into cavity 82 through opening 104. Other hangable objects may be hung in notches 110, 112. For example, strings, ropes or rolls of tape may be hung in notches 110, 112. Small items, or items that are needed by the operator with greater frequency, may be placed on upper surface 84 of tray 94, i.e., stored in tray 94, for particularly convenient access by the operator.

FIG. 4 illustrates another embodiment of an attachment 214 that is suitable for use in a pallet jack assembly of the present invention. Attachment 214 includes a base 238, stabilizing device 240, a body 242, and a storage tray 244. Body 242 includes four vertically oriented side walls, including a front wall 272, a rear wall 274, and lateral walls 276, 278. Body 242 may have a constant width 280 and a constant depth 282 throughout its height in vertical directions 284. Each of walls 272, 274, 276, 278 may be in the form of, or may be covered by, a storage device including rows and/or columns of spaced throughholes 286. Storage hooks 288 may be inserted into throughholes 286 to thereby secure hooks 288 to body 242. Tools and other items, such as a wrench 290, may be hung on hooks 288. Other aspects of attachment 214 are substantially similar to those of attachment 14, and thus are not described in detail herein in order to avoid needless repetition.

FIG. 5 illustrates yet another embodiment of an attachment 314 that is suitable for use in a pallet jack assembly of the present invention. Attachment 314 includes a base 338, stabilizing device 340, and a storage device 342 disposed directly above both base 338 and housing cap 24. In this embodiment, stabilizing device 340 is a planar extension of base 338. Storage device 342 is in the form of a hollow post having four vertically oriented side walls, including a front wall 372, a rear wall 374, and lateral walls 376, 378. Post 342 may have a constant, square-shaped cross section throughout its height in vertical directions 384. Each of walls 372, 374, 376, 378 may have a column or multiple columns of spaced throughholes 386. Storage hooks 388 may be inserted into throughholes 386 to thereby secure hooks 388 to post 342. Tools and other items may be hung on hooks 388. Other aspects of attachment 314 are substantially similar to those of attachment 14, and thus are not described in detail herein in order to avoid needless repetition.

The embodiments disclosed above are not intended to be exhaustive or to limit the invention to the precise forms disclosed in the detailed description. Rather, the embodiments have been chosen and described so that others skilled in the art may utilize their teachings.

Although described in the exemplary embodiments, it will be understood that various modifications may be made to the subject matter without departing from the intended and proper scope of the invention.

The invention claimed is:

1. A pallet jack assembly, comprising:
a pallet jack including a frame assembly; and
an attachment including a shell having a bottom wall and at least one side wall, said bottom wall and said at least one side wall defining a storage cavity, said bottom wall being supported by said frame assembly,
wherein said bottom wall of said shell is adjacent to said frame assembly of said pallet jack,
wherein said at least one side wall includes an opening into said cavity,
wherein said pallet jack includes a pallet-engaging device extending from said frame assembly in a forward direction, said opening facing in a rearward direction substantially opposite to the forward direction, and
wherein said pallet jack includes at least a second opening facing in a lateral direction substantially perpendicular to the forward direction.

2. The assembly of claim 1, wherein said attachment includes a stabilizing device connected to said at least one side wall, said stabilizing device having a surface engaging said frame assembly.

3. The assembly of claim 2, wherein said surface of said stabilizing device is substantially coplanar with a bottom surface of said bottom wall.

4. The pallet jack assembly of claim 1 wherein said opening defines a notch adapted to receive an item in a storage position.

5. The pallet jack assembly of claim 4 wherein said notch is a semi-crescent shape.

6. The pallet jack assembly of claim 1 wherein said opening is an angled opening.

7. The assembly of claim 1, wherein said opening spans over one-half the height and over one-half the width of said at least one side wall.

8. A pallet jack assembly, comprising:
a pallet jack including a frame assembly; and
an attachment including a shell having a bottom wall and at least one side wall, said bottom wall and said at least one side wall defining a storage cavity, said bottom wall being supported by said frame assembly,
wherein said bottom wall of said shell is adjacent to said frame assembly of said pallet jack,
wherein said at least one side wall includes an opening into said cavity,
wherein said pallet jack includes a pallet-engaging device extending from said frame assembly in a forward direction, said opening facing in a rearward direction substantially opposite to the forward direction, and
wherein said attachment includes:
a top wall defining said storage cavity; and
at least one upstanding wall extending from an upper surface of said top wall, said top wall and said at least one upstanding wall defining a tray on said upper surface of said top wall.

9. A storage device on a pallet jack, comprising:
a base configured to be supported by a frame assembly of the pallet jack and having a first width;

a tray including at least one upstanding wall, said tray having a second width, said second width being greater than said first width;

a tapered body interconnecting said base and said tray, wherein said body comprises a shell defining a storage cavity, wherein said shell includes a second upstanding wall and an opening in communication with said storage cavity, wherein said opening spans over one-half the height and over one-half the width of said second upstanding wall; and an attachment mechanism configured to attach said storage device to the frame assembly of the pallet jack.

10. The device of claim 9, wherein said tray and said base have substantially equal depths as defined in a direction perpendicular to the widths.

11. The device of claim 9, wherein said base includes a ridge configured to engage the frame assembly of the pallet jack.

12. The device of claim 9, wherein said opening includes at least one notch usable for storage.

13. The device of claim 9, wherein said body includes a plurality of holes configured to secure storage hooks.

14. A pallet jack assembly, comprising:
a pallet jack including a frame assembly; and
an attachment including:
   a bottom surface in engagement with said frame assembly;
   a storage device operably disposed directly above said frame assembly and said bottom surface; and
   a shell disposed between said frame assembly and said storage device,
   wherein said pallet jack includes a pallet-engaging device extending from said frame assembly in a forward direction, said frame assembly having a front surface facing in the forward direction, said storage device extending a maximum of six inches beyond the front surface of said frame assembly in the forward direction,
   wherein said storage device comprises a substantially horizontally oriented tray, and
   wherein said tray includes at least one upstanding wall extending from an upper surface of said tray.

15. The assembly of claim 14, wherein said shell includes an opening in communication with a storage cavity defined by said shell.

16. A pallet jack assembly, comprising:
a pallet jack including a frame assembly; and
an attachment including a shell having a bottom wall and at least one side wall, said bottom wall and said at least one side wall defining a storage cavity, said bottom wall being supported by said frame assembly, wherein said bottom wall of said shell is adjacent to said frame assembly of said pallet jack, wherein said attachment includes a stabilizing device connected to said at least one side wall, said stabilizing device having a surface engaging said frame assembly,
wherein said pallet jack includes a pallet-engaging device extending from said frame assembly in a forward direction, wherein said stabilizing device extends opposite said forward direction.

17. The pallet jack assembly of claim 16, wherein said at least one side wall defines an upper opening into said cavity.

18. The assembly of claim 16, wherein said attachment includes at least one hook attached to said bottom wall of said shell and latched onto said frame assembly to thereby secure said attachment to said pallet jack.

* * * * *